June 3, 1930.  C. E. SPARHAWK  1,761,242
AIRPLANE
Filed May 14, 1928   3 Sheets-Sheet 1
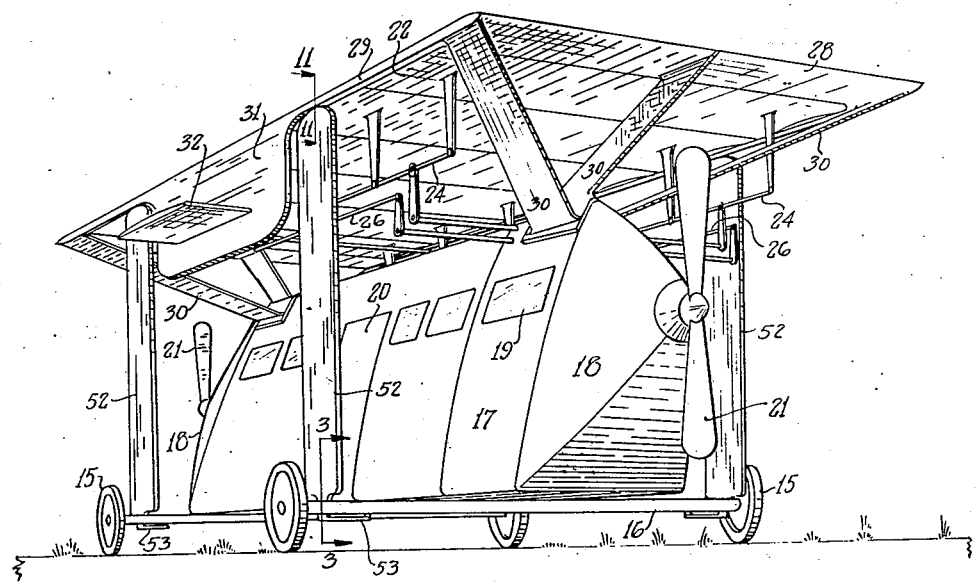
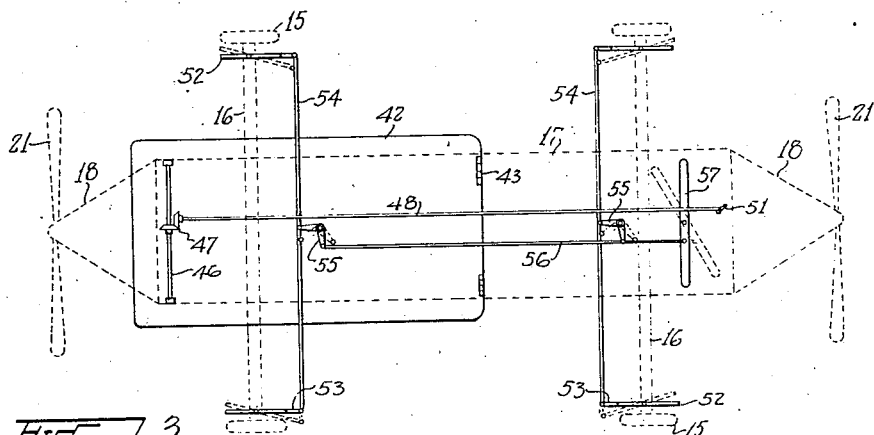
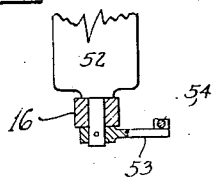
INVENTOR
C. E. Sparhawk
BY C. B. Birkenbeuel
ATTORNEY

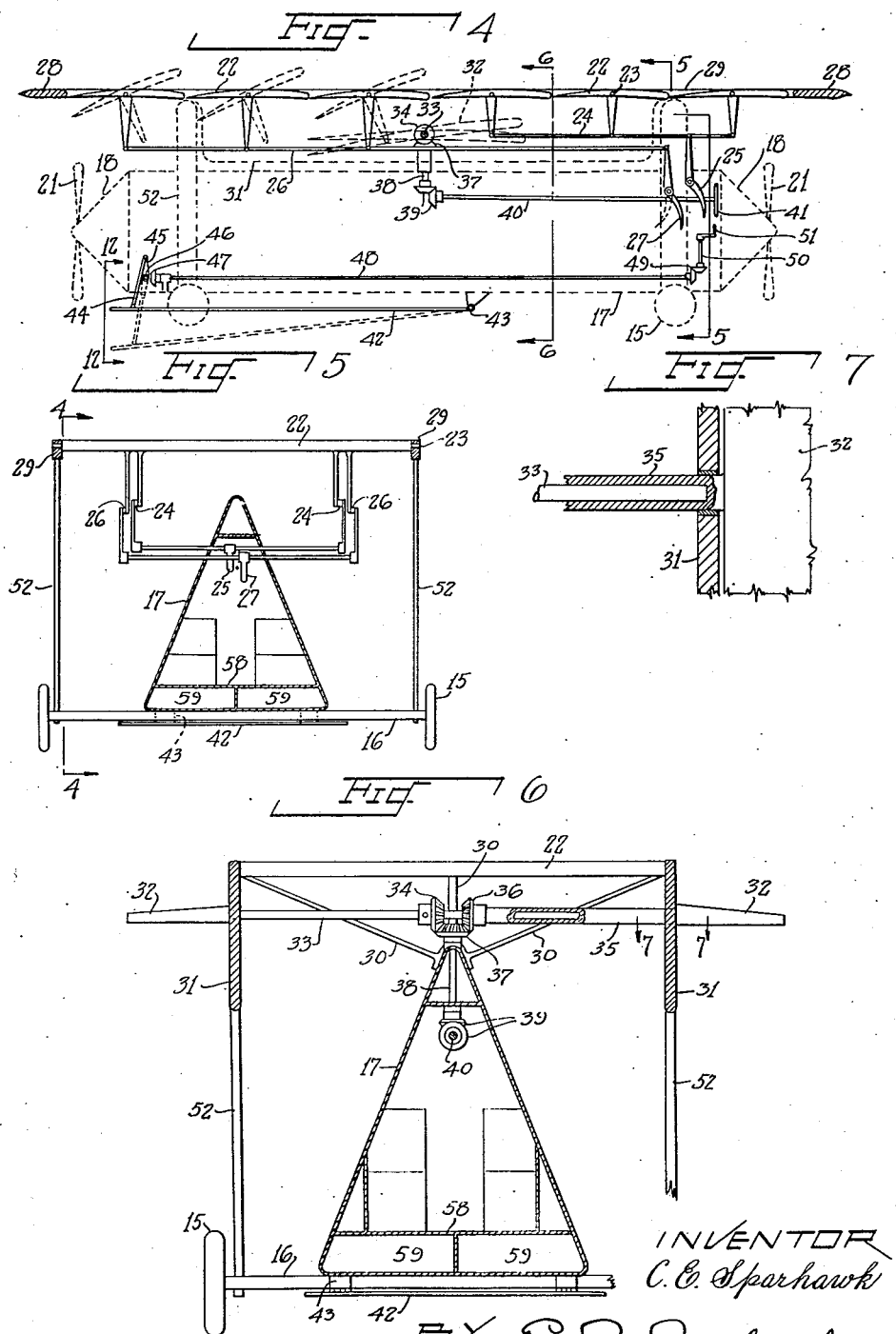

June 3, 1930.  C. E. SPARHAWK  1,761,242
AIRPLANE
Filed May 14, 1928.  3 Sheets-Sheet 3
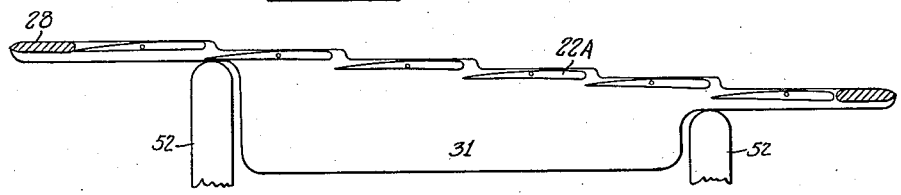
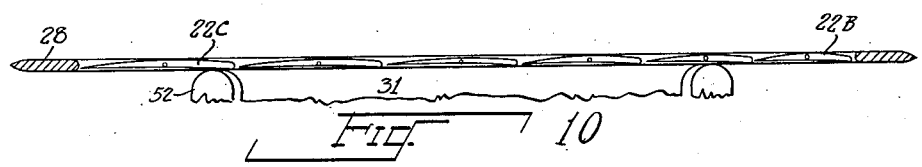
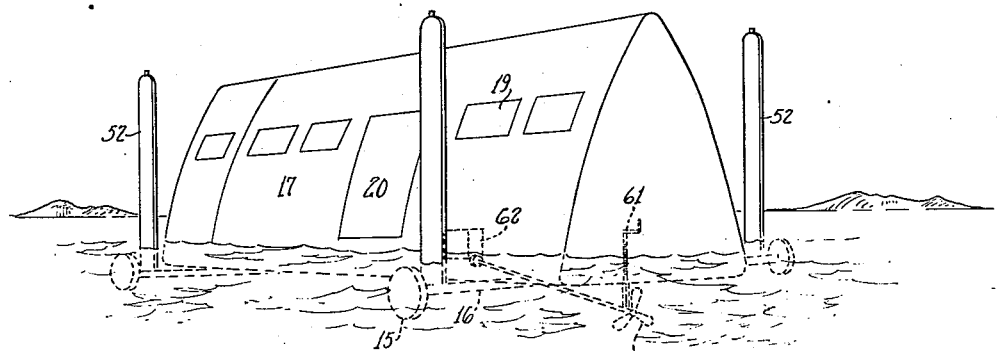
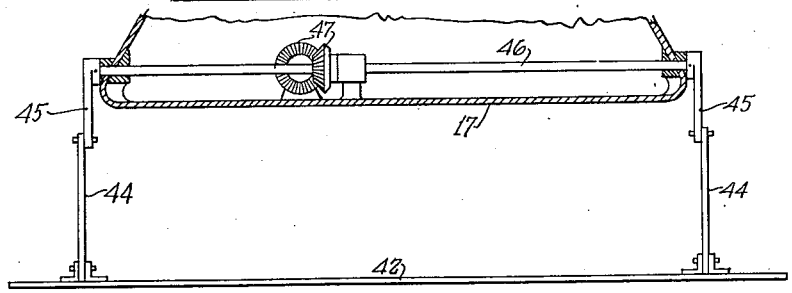
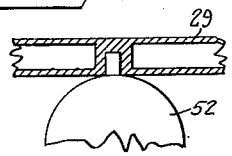
INVENTOR
C. E. Sparhawk
BY E. B. Birkenbeul.
ATTORNEY Patented June 3, 1930

1,761,242

UNITED STATES PATENT OFFICE

CHARLES E. SPARHAWK, OF STEILACOOM, WASHINGTON

AIRPLANE

Application filed May 14, 1928. Serial No. 277,462.

This invention relates generally to aviation, and particularly to a new form of heavier-than-air flying machine.

The main object of this invention is to provide a flying machine having extremely large wing area and lifting capacity.

The second object is to so construct the airplane that it can travel in the air, on land or in the water.

The third object is to so construct the airplane that its wings, propeller and propeller operating engines can be easily separated from the cabin or fuselage when used as a water craft.

These, and other objects, will become more apparent from the specification following as illustrated in the accompanying drawings, in which:

Figure 1 is a perspective view of the airplane. Figure 2 is a plan of the rudder control showing the parts of the plane in dotted lines. Figure 3 is a fragmentary section taken along the line 3—3 in Figure 1. Figure 4 is a section taken along the line 4—4 in Figure 5. Figure 5 is a section taken along the line 5—5 in Figure 4. Figure 6 is a section taken along the line 6—6 in Figure 4. Figure 7 is a section taken along the line 7—7 in Figure 6. Figure 8 is a longitudinal section through a modified form of wing construction. Figure 9 is a similar view through still another form of wing construction. Figure 10 is a perspective view of the cabin or fuselage being used as a boat from which the wings and engine have been removed. Figure 11 is a vertical section taken along the line 11—11 in Figure 1. Figure 12 is a rear elevation of the auxiliary wing taken along the line 12—12 in Figure 4 with the lower portion of the fuselage broken away in section.

Similar numbers of reference refer to similar parts throughout the several views.

Referring in detail to the drawings, the airplane about to be described is mounted on a set of ground-engaging wheels 15 which are mounted on the ends of the axles 16 upon which rests the fuselage or cabin 17, at each end of which is mounted an engine compartment 18 which may be removably attached to the cabin 17 if desired.

The cabin 17 is somewhat A-shaped and is provided with windows 19 and doors 20 which are capable of being rendered water-tight. Propellers 21 are provided at the front and rear of the fuselage 17.

The wings 22 are several in number and are mounted on transverse pivots 23. The forward half of the wings are joined together by a connecting rod 24 which is operable by a hand lever 25, and the rearward wings 22 are joined by a connecting rod 26 which are operable by the hand lever 27. At the front and rear edges of the wing surface are positioned the end members 28 which unite the side supports 29 and are themselves united to the cabin 17 by means of the braces and struts 30 which are removably attached to the cabin 17.

To each side support 29 of the wing surface is attached a drift wing 31 from which extends the wing 32, there being one at each side of the machine, and these wings serve as aelerons for steering the craft. One wing 32 is mounted on the transverse shaft 33 to which is secured a bevel gear 34, and the other wing 32 is mounted on a sleeve 35 to which is secured a bevel gear 36. Both gears 34 and 36 are driven by the bevel gear 37 on the shaft 38 which, in turn, is driven by the bevel gears 39 from the shaft 40, which is provided with a hand wheel 41.

To the under side of the cabin 17 is hinged an auxiliary under wing 42 by means of a hinge 43 and its rear end is supported by the links 44 on the rocker arms 45 which are mounted on the shaft 46, which is driven by the gears 47 from the shaft 48 which, in turn, is driven through the bevel gears 49 on the shaft 50 on which is mounted a crank 51.

Between the axles 16 and the members 29 are mounted the rudders 52 whose steering arms 53 are joined by the conecting rods 54, each of which is attached to a bell crank lever 55, both of which levers 55 are joined by the connecting rod 56 which is operated by a hand lever 57.

It is preferable to provide the cabin 17 with a floor 58 under which are formed the oil tanks 59 which may be used as ballast tanks when the chaft is afloat.

In the form of the device shown in Figure 8 the wings 22-A are placed in stepped relation to each other; whereas in Figure 9 the foremost wing 22-B is the narrowest and the rearmost wing 22-C is the widest, the greater lifting capacity being required on the rear, due to the fact that the forward planes detract from the efficiency of the rearward planes.

It can readily be seen that by this construction it is possible to secure an enormous lifting action from the wings 22, while perfect lateral stability may be obtained by the aelerons or side wings 32, plenty of traction being provided by the two propellers 21.

If the craft is forced to alight in the water the engine compartments 18 are released from within the cabin by any convenient means, such as bolts or other contrivances (not shown), thus converting the machine into a large glider from which a large portion of its weight has been freed.

Refinements such as shock absorbers for the wheels 15 and other details well within the knowledge of the modern designer of air craft have been eliminated for the purpose of illustrating the device and giving a clearer description of the principles of the working thereof.

When alighting in the water, as previously suggested, it may be found desirable to lower the special propeller 60 by means of a crank 61 which is driven from a special motor 62 which is capable of sending the craft forward through the water for a much greater distance than if an attempt were to be made to utilize larger power units within the compartments 18.

It will be clear that with a fuselage shaped as shown that the natural draft of the fuselage in water will require that means be provided for rendering the fuselage water-tight, and that the usual contrivances for providing the fresh air and disposing of any water which may secure entrance must be provided, which, however, have not been described as they are all well within the knowledge of the ordinary builder of planes and sea-going craft.

While I have shown the steering controls as being operated by a hand lever, it must of course be understood that in practice it will be preferable to make this drive through a worm and wheel, or some other mechanism not reversible, as the strain of steering would be too great to be handled continuously by a direct leverage.

The object in thus illustrating this mechanism was merely to secure the maximum amount of simplicity in the drawing.

I am aware that many forms of airplanes have been constructed in the past; it is therefore not my intention to cover such devices broadly, but I do intend to cover all such forms and modifications thereof as fall fairly within the appended claims.

I claim:

1. An airplane having a landing gear, a fuselage mounted on said landing gear, a plurality of transverse wings removably mounted above said fuselage in a longitudinal row, drift wings at each side of said transverse wings, an aeleron on the outer side of each drift wing, and rudders between said wings and landing gear.

2. An airplane having a landing gear, a fuselage mounted on said landing gear, an under wing hinged to the under side of said fuselage having means for raising and lowering the rearward end thereof, a plurality of transverse wings mounted above said fuselage in a longitudinal row, means for controlling the forward and rearward sections of said wings separately, and rudder members between said transverse wings and the landing gear.

3. An airplane having a landing gear, a fuselage mounted on said landing gear, an under wing on the under side of said fuselage having means for elevating the forward and rearward ends thereof with relation to each other, a plurality of transverse lifting wings above said fuselage mounted in a longitudinal row having means for operating the forward and rearward wings separately, a propeller at the forward and rearward ends of said fuselage having propelling means therefor removably attached to said fuselage, means for providing lateral stability for the airplane consisting of a pair of drift wings mounted on opposite sides of said lifting wings, and a longitudinal tiltable aeleron on the outside of each drift wing having means for operating same in opposite directions.

CHARLES E. SPARHAWK.